United States Patent [19]

Mathews et al.

[11] Patent Number: 5,278,964
[45] Date of Patent: Jan. 11, 1994

[54] MICROPROCESSOR SYSTEM INCLUDING A CACHE CONTROLLER WHICH REMAPS CACHE ADDRESS BITS TO CONFINE PAGE DATA TO A PARTICULAR BLOCK OF CACHE

[75] Inventors: Gregory Mathews, Cupertino; Ghassan Khadder, San Jose, both of Calif.

[73] Assignee: Intel Corporation, Santa Clara, Calif.

[21] Appl. No.: 793

[22] Filed: Jan. 4, 1993

Related U.S. Application Data

[63] Continuation of Ser. No. 596,500, Oct. 12, 1990, abandoned.

[51] Int. Cl.$^5$ ............................................. G06F 12/10
[52] U.S. Cl. ..................... 395/400; 364/DIG. 1
[58] Field of Search ................ 395/400, 425; 364/200

[56] References Cited

U.S. PATENT DOCUMENTS

| | | | |
|---|---|---|---|
| 3,979,726 | 9/1976 | Lange et al. | 395/425 |
| 4,441,155 | 4/1984 | Fletcher et al. | 395/400 |
| 4,849,875 | 7/1989 | Fairman et al. | 395/425 |
| 4,953,079 | 8/1990 | Ward et al. | 395/425 |
| 5,010,475 | 4/1991 | Hazawa | 395/400 |
| 5,033,027 | 7/1991 | Amin | 365/222 |

*Primary Examiner*—Glenn Gossage
*Attorney, Agent, or Firm*—Blakely, Sokoloff, Taylor & Zafman

[57] ABSTRACT

A cache controller for a set associative cache selectively remaps predetermined bits of the cache address so as to confine data from a single memory page to a particular block of the cache memory. When changing a memory page, only the particular block of the cache in which data from that page may be stored is flushed, thereby preserving the remaining contents of the cache.

3 Claims, 4 Drawing Sheets

MICROPROCESSOR SYSTEM INCLUDING A CACHE CONTROLLER WHICH REMAPS CACHE ADDRESS BITS TO CONFINE PAGE DATA TO A PARTICULAR BLOCK OF CACHE

This is a continuation of application Ser. No. 07/596,500, filed Oct. 12, 1990, now abandoned.

FIELD OF THE INVENTION

This invention relates to the field of cache memories for microprocessor systems, and particularly to a cache controller for an associative cache in a system having a page mapped memory.

BACKGROUND OF THE INVENTION

A significant barrier to improving the performance of a microprocessor system is the access time of system memory. Although the speed of semiconductor memories has improved over time, the speed of dynamic random access memory ("DRAM") devices has not kept pace with the speed of the processors. Consequently, when executing most applications, a processor will experience numerous wait states while system memory is accessed. A frequently employed solution to this problem is the incorporation in the microprocessor system of a high-speed cache memory comprising static random access memory ("SRAM") devices. In general, a cached system will experience significantly fewer wait states than a non-cached system.

The simplest form of cache is generally referred to as a direct-mapped cache, wherein contents of the system memory are retrieved and stored in cache locations having the same low-order address. For example, if an 8K cache is provided, the thirteen lowest order address bits of the system memory location to be retrieved define the cache storage location A significant disadvantage of a direct-mapped cache is that the cache contents will be overwritten whenever there is an access request to a system memory location having the same low order address but a different high order address.

To overcome this disadvantage, a set associative cache structure is sometimes used. For example, with a two-way set associative cache, the cache memory is physically divided into two banks of SRAMs. Thus, a two-way set associative 8K cache would comprise two 4K banks of SRAM. Data retrieved from system memory may be mapped into either one of the two banks since the two banks have identical low order addresses. A cache hit in one bank causes a least recently used (LRU) flag to be set for the corresponding address in the other bank. Thus, cache writes may be directed to the cache bank whose contents were least recently used, thereby preserving the more recently used data for subsequent accesses by the central processing unit ("CPU"). An associative cache significantly improves the cache hit rate and thus improves overall system performance.

Modern microprocessor systems have enormous virtual addressing capabilities. For example, the protected virtual mode of the Intel 386 TM SX processor supports a virtual memory of 64 terabytes ($2^{46}$ bytes). Management of such a large virtual address space is facilitated by an expanded memory system (EMS) such as specified in the Lotus/Intel/Microsoft (LIM) 4.0 standard. Under this standard, address space is partitioned into 16K byte pages that are mapped into the physical address space. Use of EMS complicates cache management since any changes to the EMS mapping will invalidate cached data. To preserve cache integrity, prior art systems must either make EMS pages non-cacheable and suffer a loss in system performance or flush the contents of the cache whenever an EMS mapping change invalidates the contents.

One of the objects of the present invention is to provide a cache controller that overcomes many of the prior art disadvantages of operating in an EMS environment.

SUMMARY OF THE INVENTION

The present invention provides a cache controller for a set associative cache that selectively remaps predetermined bits of the cache address so as to confine data from a single memory page to a particular block of the cache memory. When changing a memory page, only the particular block of the cache in which data from that page may be stored is flushed, thereby preserving the remaining contents of the cache.

DETAILED DESCRIPTION OF THE INVENTION

In the following description, for purposes of explanation and not limitation, specific mappings, bit assignments, etc. are set forth in order to provide a thorough understanding of the present invention. However, it will be apparent to one skilled in the art that the present invention may be practiced in other embodiments that depart from these specific details. In other instances, detailed descriptions of well known aspects of microprocessor systems are omitted so as to not obscure the description of the present invention with unnecessary detail.

System Overview

The present invention is advantageously employed in a microprocessor design optimized for applications requiring low power consumption and compact size. Such applications particularly include small personal computers of the types commonly referred to as laptops and notebooks. One embodiment of such a microprocessor is briefly described below; however, it is to be understood that the present invention is not limited to this particular microprocessor design, and may be incorporated in virtually any processor design.

Figure 1:
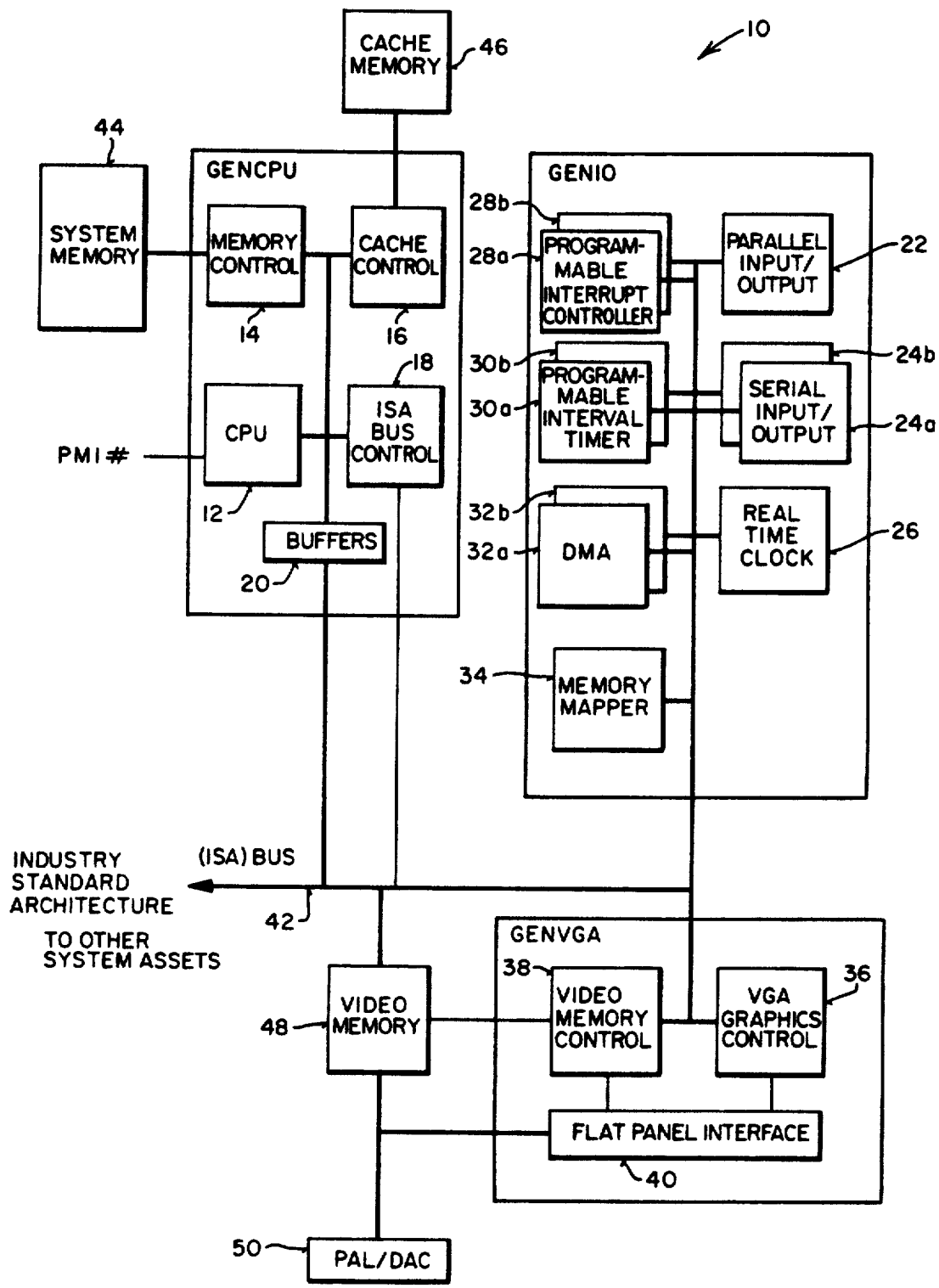
FIG. 1 is a functional block diagram of a microprocessor system embodying the present invention.

Referring to FIG. 1, a processor system 10 is shown. System 10 comprises three main processor components, designated as GENCPU, GENIO and GENVGA. GENCPU is an expanded central processing unit including the CPU 12, a memory controller 14, a cache controller 16, Industry Standard Architecture ("ISA") bus control logic 18 and line buffers 20.

In the described embodiment, CPU 12 is essentially a 386 ™ SX CPU manufactured by Intel Corporation, the corporate assignee of this invention. Throughout this description, certain terminology relating to the 386 ™ SX CPU, such as register names, signal nomenclature, etc., is employed to describe the present invention. Such terminology is understood by practitioners in the field of microprocessor design and will therefore not be explained at length herein. For further information relating to the internal structure of CPU 12, reference is made to the "386 ™ SX Microprocessor Hardware Reference Manual" published by Intel Corporation (Santa Clara, Calif.) as publication number 240332 and related publications.

GENIO is a single chip input/output unit comprising parallel input/output ("PIO") ports 22, dual series input/output ("SIO") ports 24a, 24b, real time clock ("RTC") unit 26, dual programmable interrupt controllers ("PIC's") 28a, 28b, dual programmable interval timers ("PIT's") 30a, 30b, dual direct memory access ("DMA") controllers 32a, 32b and memory mapper 34.

GENVGA is a single chip graphics interface comprising video graphics array ("VGA") graphics controller 36, video memory controller 38 and interface 40 for a flat panel display unit.

All of the processor units communicate with one another and with other system components (such as expansion slots, keyboard controller, disk controllers, etc.) via ISA bus 42.

External to the three main components of system 10 are system memory 44, optional cache memory 46 and optional video memory 48. An optional programmable array logic/digital to analog converter ("PAL/DAC") unit 50 provides a video interface with a conventional VGA monitor.

Cache Controller Implementation

Figure 2:
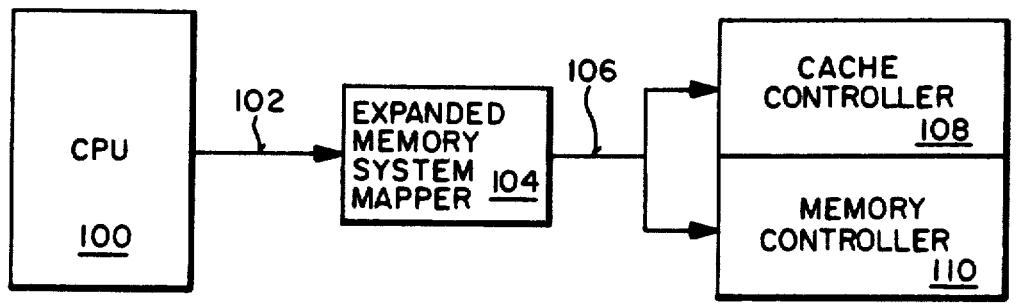
FIG. 2 is a simplified functional block diagram of a prior art EMS mapper implementation.

Prior art systems that include both a cache memory and an EMS mapping function may be implemented in one of two ways. FIG. 2 illustrates a system wherein CPU address bus 102 from CPU 100 is coupled to EMS mapper 104. Remapped addresses on bus 106 are then provided to both cache controller 108 and memory controller 110. A system implemented as illustrated in FIG. 2 has the advantage of being fully cacheable since remapped addresses are provided to both the cache controller and the memory controller. However, the system of FIG. 2 has the disadvantage of inserting a delay in the address path to the cache controller when EMS is being used and thus will likely cause CPU 100 to experience additional wait states.

Figure 3:
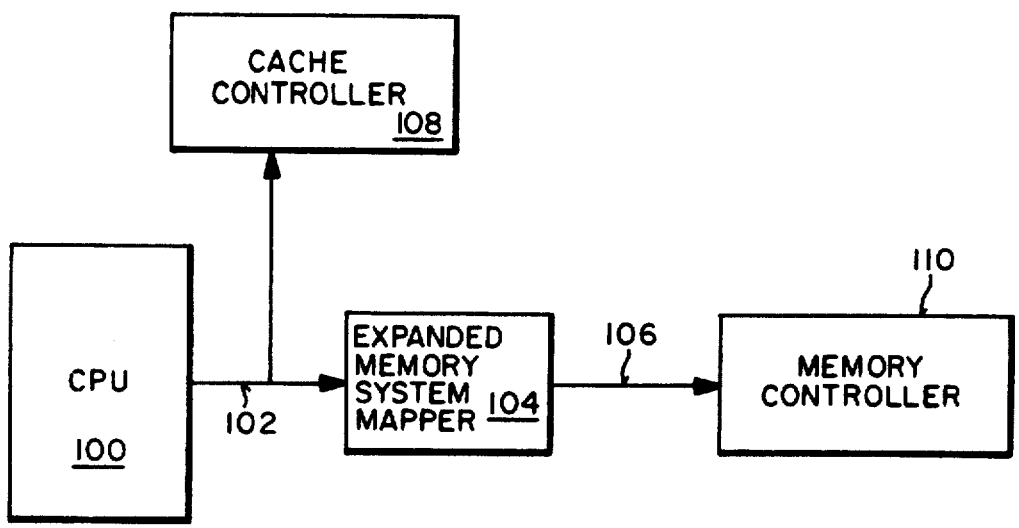
FIG. 3 is a simplified block diagram of an alternative prior art EMS mapper implementation.

An alternative implementation is illustrated in FIG. 3. In this system, CPU address bus 102 is coupled both to EMS mapper 104 and to cache controller 108. Remapped address bus 106 from the EMS mapper is coupled to memory controller 110 as in the system illustrated in FIG. 2 The address path to the memory controller is thus identical in both of the systems illustrated in FIGS. 2 and 3. The system of FIG. 3 has the advantage of eliminating any wait states caused by the EMS mapper to cache access requests However, this implementation has the disadvantage of requiring that the cache be flushed whenever EMS is enabled, disabled, EMS page mapping is modified, or the EMS register set is changed This can significantly degrade cache performance. Yet another alternative is to make all EMS memory areas non-cacheable, but this imposes an even more serious performance penalty.

The present invention is implemented generally in accordance with the system architecture illustrated in FIG. 3, but is done in such a manner that EMS memory may be cached without sacrificing cache performance. The performance objective of the present invention is based upon two assumptions, namely that the EMS function will be enabled or disabled relatively infrequently and that a high percentage (on the order of 90%) of hardware EM users use only one EMS register set. Thus, the most frequently occurring event that requires cache flushing is the remapping of an EMS page. The cache controller of the present invention handles this situation by allowing the selective flushing of the cache in 16K byte blocks, corresponding to the size of an EMS page, regardless of cache associativity. Thus, when and if an EMS page is changed, only that 16K block of the cache which corresponds to the page being remapped will need to be flushed, rather than the entire cache as in prior art systems.

Figure 4:
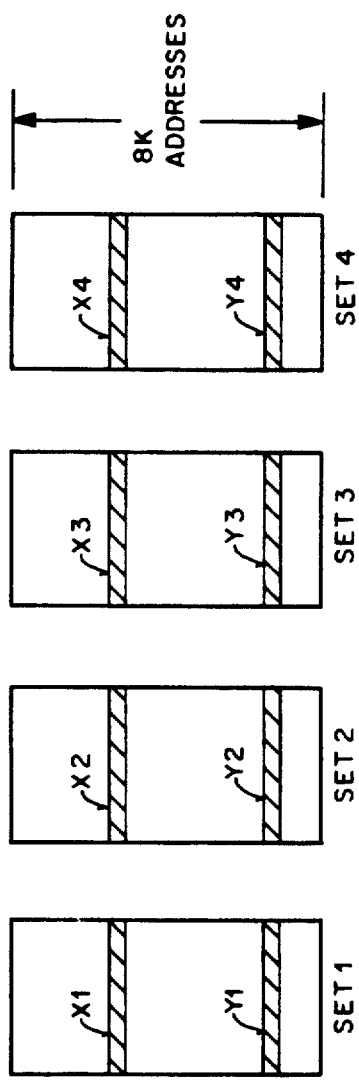
FIG. 4 illustrates prior art cache mapping of a memory page.
Figure 5:
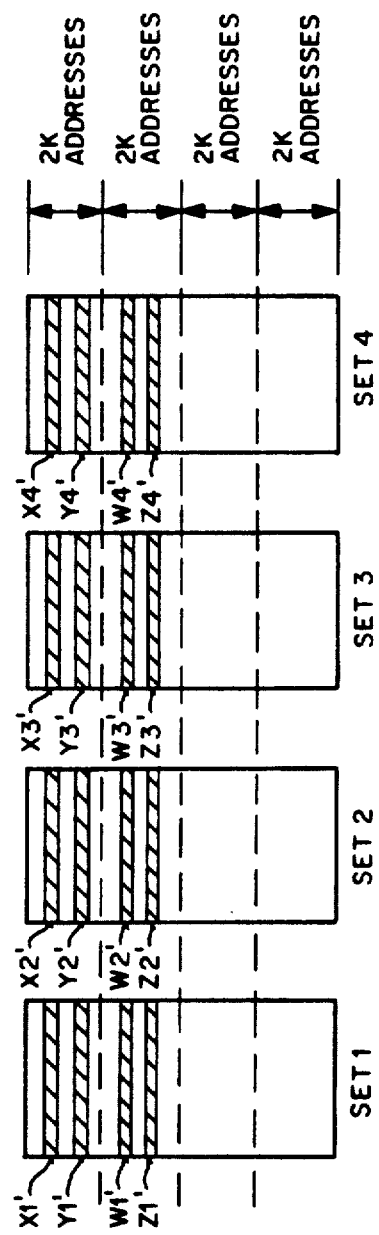
FIG. 5 illustrates cache mapping of a memory page according to the present invention.

Implementation of the present invention may be conceptualized with the aid of FIGS. 4 and 5. FIG. 4 diagramatically illustrates the structure of a conventional 64K 4-way set associative cache. Using a 16 bit (2 byte) data word structure, each set of the cache comprises 8K word addresses. Let X specify a location in main memory and W a location equal to $X + 16K$ so that X and W are in different 16K memory pages, but at the same relative position in their respective pages. Data retrieved from location X or W of main memory may be placed into the cache in any one of the four sets at the locations indicated as X1-X4. Data from main memory locations $Y = X + 8K$ or $Z = W + 8K$ (where Y and Z are in the same memory pages as X and W, respectively) can be placed into the cache in any one of the four sets at the locations designated as Y1-Y4. Thus, data from a single 16K page of memory may be randomly distributed throughout the cache structure. Consequently, when a page is remapped, it is necessary to flush the entire contents of the cache in order to assure the complete deletion of the old data from cache memory and thus insure cache coherency.

Referring now to FIG. 5, the mapping of data from memory into the cache by the cache controller of the present invention is illustrated. The incoming addresses to the cache controller are remapped so that all of the addresses within a single 16K page are collapsed into a 2K block of cache word addresses. As shown, data from location X of a main memory page may be placed into the cache in any one of the sets at the locations designated X1'-X4'. Likewise, data from locations W, Y and Z (as defined above) can be placed into any one of the sets at the locations designated as W1'-W4'Y1'-Y4'and Z1'-Z4', respectively. By this remapping of the incoming addresses to the cache controller, all cached data from a single 16K page of main memory will be confined to a contiguous 16K block of the cache, i.e., one 2K block of word addresses across each of the four sets. As a result, when a main memory page is remapped, it is necessary only to flush the 16K block of the cache in which data from that page has been stored. Data from other pages stored in the remaining 48K of the cache are unaffected. Therefore, cache performance is significantly improved in comparison to prior art systems that must flush the entire cache.

Figure 6:
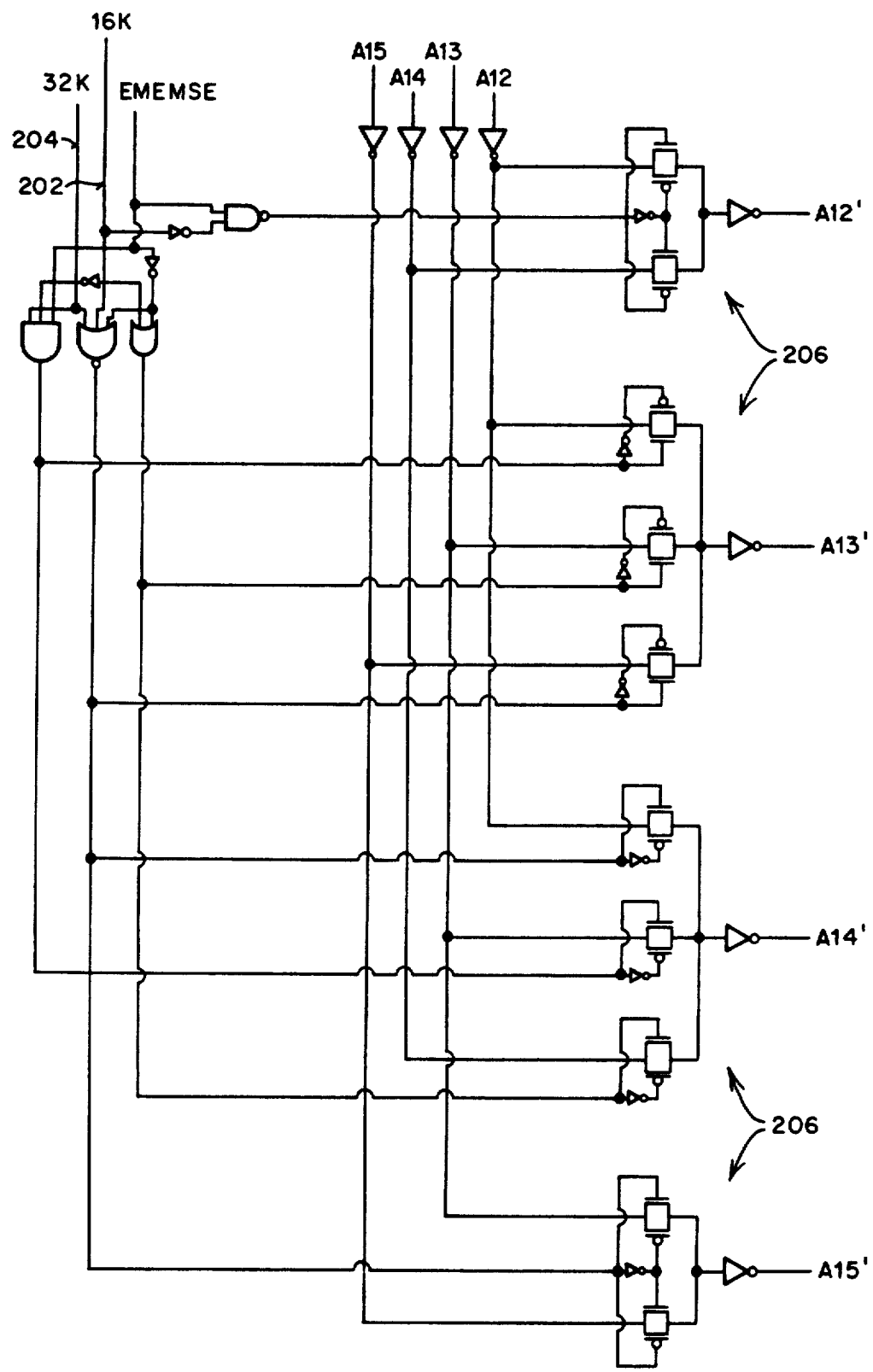
FIG. 6 is a logic circuit diagram for the cache address mapping of the present invention.

The detailed implementation of the present invention is illustrated in FIG. 6. This is used in conjunction with the system illustrated in FIG. 1 which is designed to accommodate a 16K, 32K or 64K cache. A high state on input 202 indicates a 16K cache, whereas a high state on input 204 indicates a 32K cache. If neither input is set high, a 64K cache is assumed.

The physical address provided from CPU12 comprises address bits A1–A23. For a 64K byte four-way set associative cache, bits A1–A13 define one of 8K cache word addresses and higher order bits A12–A23 comprise a tag field used by cache controller 16 to determine if there is a cache hit. CPU address lines A12–A15 are remapped by the cache controller whenever EMS is enabled as indicated by a high state of signal EMEMSE. CPU address lines A12–A15 are remapped by gate circuits 206 to develop cache address bits A12'–A15' in accordance with the following table:

| EMEMSE | 16K | 32K | A12' | A13' | A14' | A15' |
|---|---|---|---|---|---|---|
| 0 | X | X | A12 | A13 | A14 | A15 |
| 1 | 1 | 0 | A12 | A13 | A14 | A15 |
| 1 | 0 | 1 | A14 | A12 | A13 | A15 |
| 1 | 0 | 0 | A14 | A15 | A12 | A13 |

It will be observed that the CPU address bits are not remapped if EMS is disabled. Likewise, remapping is not performed in the case of a 16K cache since this is equal in size to the EMS page and therefore requires that the entire cache be flushed when the EMS page is remapped.

It will be recognized that the above described invention may be embodied in other specific forms without departing from the spirit or essential characteristics of the disclosure. Thus, it is understood that the invention is not to be limited by the foregoing illustrative details, but rather is to be defined by the appended claims.

We claim:
1. A microprocessor system comprising:
   a central processing unit;
   a page mapped memory organized in a plurality of pages, each page having a plurality of consecutive memory addresses;
   an address bus having a plurality of address bus lines coupled to the central processing unit and the page mapped memory;
   a set associative cache including a plurality of sets with a plurality of consecutive cache addresses common to all of the sets and having a plurality of cache address lines for designating one of the consecutive cache addresses, the number of cache addresses being no greater than the number of consecutive memory addresses in a page of the page mapped memory;
   a cache controller coupled to the address bus and the cache address lines of the set associative cache, said cache controller including a plurality of gating circuits, each of said plurality of gating circuits being associated with a respective one of the plurality of cache address lines, each of said gating circuits having inputs coupled to predetermined ones of the address bus lines and an output coupled to the respective one of the cache address lines, said cache controller further including control logic coupled to the plurality of gating circuits to selectively connect each respective cache address line to a selected one of the predetermined ones of the address bus lines such that all memory addresses within a single page of the page mapped memory are mapped into a block of the cache addresses, said block of the cache addresses comprising fewer addresses than the memory addresses within the single page of the page mapped memory.

2. The microprocessor system of claim 1 wherein each page of memory comprises 16K memory addresses, said cache comprises a four-way associative cache, and all memory addresses within a single page of memory are mapped into a block of said cache comprising 2K cache addresses.

3. The microprocessor system of claim 2 wherein a memory address is specified by address bits A1 to AN inclusive, where N is an integer greater than 15 and A1 is the least significant bit, a cache address is specified by address bits A1 to A13 inclusive, and said gating circuits map cache address bits A12 to A15 according to:
   A12 in place of A14
   A13 in place of A15
   A14 in place of A12
   A15 in place of A13.

* * * * *

UNITED STATES PATENT AND TRADEMARK OFFICE
CERTIFICATE OF CORRECTION

PATENT NO. : 5,278,964
DATED : Jan. 11, 1994
INVENTOR(S) : Gregory Mathews, et al It is certified that error appears in the above-indentified patent and that said Letters Patent is hereby corrected as shown below:

Column 1, line 61, Insert -- address -- after "virtual"

Column 3, line 16, Delete "series"   Insert --serial--

Signed and Sealed this

Nineteenth Day of September, 1995

Attest:

BRUCE LEHMAN

Attesting Officer      Commissioner of Patents and Trademarks